Feb. 20, 1945.     C. L. ROSSELOT     2,369,755
POWDERED LIME STONE SPREADER AND THE LIKE
Filed May 17, 1941
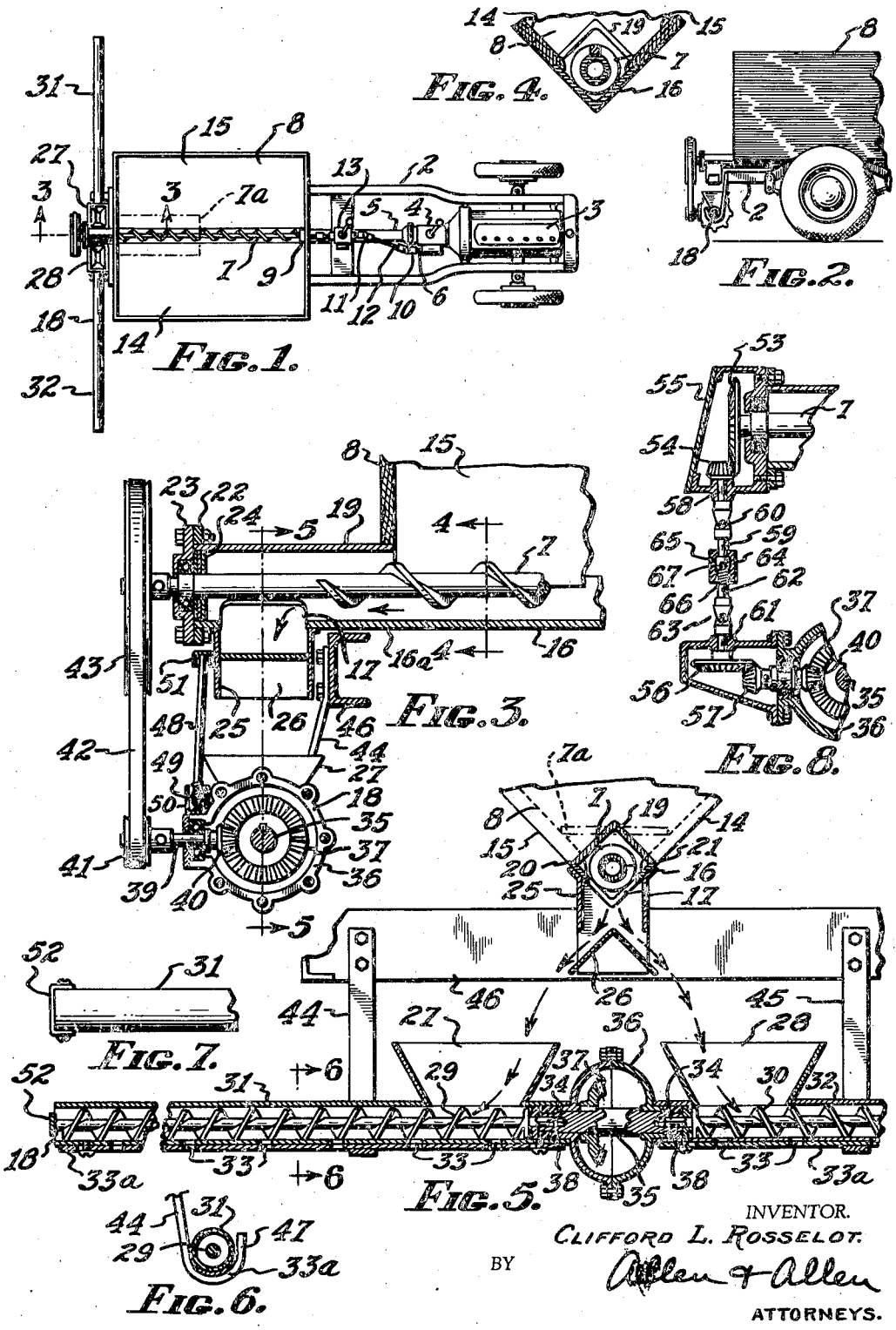
INVENTOR.
CLIFFORD L. ROSSELOT.
BY Allen & Allen
ATTORNEYS.

Patented Feb. 20, 1945

2,369,755

UNITED STATES PATENT OFFICE 2,369,755

POWDERED LIMESTONE SPREADER AND THE LIKE

Clifford L. Rosselot, Owensville, Ohio

Application May 17, 1941, Serial No. 393,879

1 Claim. (Cl. 275—2)

My invention relates to agricultural machinery for the purpose of spreading lime stone or other pulverant material on land by means of a motor vehicle.

There have been various structures suggested for this above purpose, but so far as I am advised these do not provide for adequate distribution with regularity and over a wide range irrespective of wind disturbance. The usual plan in a lime spreader is to cause the pulverized lime stone to fall upon a whirling disk which fans it out into the air behind the spreader. The influence of drafts of air upon the distribution of the powder upon the land is obvious.

According to my invention I provide for a lateral distribution device which positively ejects small streams of the powdered material over a fairly wide band, transverse the vehicle. Such a means of distribution, as shown, consists of screw conveyors operating in perforated tubes through the perforations of which the powder falls. As a means for distributing material the particular device does not possess novelty of itself, but the width required for the band of powder for economical operation is such that the device should be wider than the vehicle itself by a considerable margin. As a result it is necessary to provide for a suitable mounting for the lateral distributor, such that it can be readily lifted away from the vehicle and replaced thereon, as when passing through gates, between trees etc. during operation.

It is my object to provide an effective drive for moving pulverant material from a container therefor, such as a truck body, to the point for distribution, to provide a simple and effective truck body, conveyor and drive therefor, to provide a relatively light weight lateral distributor extending beyond the lateral margins of the vehicle or truck body, and for an economical and effective drive for the same, coupled to the drive for the truck body screw, the whole lateral distributor being readily removable bodily from its position when in use and readily replaceable.

I have described a structure in detail which embodies the features of my invention and for the novelty inherent therein I refer to the appended claim, forming part of my specification.

In the drawing:

Figure 1 is a plan view showing a preferred arrangement of my spreader.

Figure 2 is a fragmentary side elevation showing the rear end of the spreader.

Figure 3 is an enlarged fragmentary sectional view taken along line 3—3 of Figure 1.

Figure 4 is a fragmentary section taken along line 4—4 of Figure 3.

Figure 5 is a sectional view with parts broken away taken along line 5—5 of Figure 3.

Figure 6 is a fragmentary section taken along line 6—6 of Figure 5.

Figure 7 is a fragmentary plan view taken at the left end of Figure 5, and

Figure 8 is a sectional view illustrating an alternate drive arrangement between the conveyor screws.

Referring to Figure 1, I have illustrated a truck chassis 2 having an engine 3 and the usual transmission 4 with torque tube 5 enclosing a drive shaft for supplying motive power to the rear wheels of the truck or vehicle.

The transmission 4 is of a type commonly employed in trucks and has a power take-off shaft 6 from which shaft the power developed by engine 3 may be utilized for performing work other than that of driving the vehicle.

If a tractor is used for the driving device, then the frame 2 of the vehicle would terminate in a fifth wheel or drag link and the power be supplied to the apparatus from the power take-off of the tractor.

As shown in the drawing, I employ the shaft 6 for driving a conveyor screw or worm 7 which worm is located at the bottom of a V-shaped hopper or material container 8.

The worm 7 is provided at its front end with a suitable thrust bearing 9 and is driven from shaft 6 through universal or knuckle joints 10 and 11, rod 12, and a selective speed transmission 13.

The shaft 6 rotates at a speed proportionate to that of the engine 3 and hence to the lineal movement of the vehicle, so that the transmission 13 permits a constant amount of material to be distributed per acre regardless of the vehicle speed. To avoid too much packing of material about the screw 7 during transportation to the field to be limed or fertilized, a plate 7a may be placed over the screw when loading and lifted away when distribution is started.

Referring to Figures 3 and 4, the side walls 14 and 15 of the hopper 8 terminate at their lower edges in an angle bar 16 in which bar or valley the worm 7 rotates to convey the material rearward. The angle bar 16 extends beyond the rear wall of hopper 8 as at 16a in Figure 2 where the bar is cut away as at 17 to permit material carried rearward by worm 7 to drop downward and be finally distributed, as will be presently described, by the cross conveyor generally indicated at 18 in the various figures.

For covering the extended portion 16a of the angle bar 18, I employ a short length of like material 19, the members being welded together at their meeting edges 20 and 21 to enclose the rear portion of worm 7. As seen in Figure 3 a flange member 22 is welded at the rear terminus of members 18 and 19 and to this flange is bolted a bearing member 23 which provides a support for the rear end of worm 7. The bearing 23 will, of course, be provided with a suitable dust seal or the like indicated at 24.

As seen in Figure 5 the material emerging through the opening 17 falls through a short down chute 25 having at its lower end a dividing plate 26 which separates the downward stream of material into two parts as indicated. The two streams of material, thus separated, fall into small receivers or hoppers 27 and 28 from which hoppers the material is carried outwardly by the conveyor screws or worms 29 and 30 respectively. The worms 29 and 30 are housed in tubes 31 and 32 which tubes are perforated at suitable intervals as at 33 to permit final dispersement of the material. The size of the outlet holes 33 can be controlled by a slide 33a—similar to an ordinary damper plate, held by screws passing through slots, into the tubes.

The worms 29 and 30 may be driven at a speed proportionate to that of the worm 7 in various ways but I prefer the arrangement shown in detail in Figures 3 and 5. As here shown the inner ends of the said worms 29 and 30 consist of flattened or squared shaft portions 34 which are engaged by similar shaped recesses or sockets in either end of an intervening shaft 35. The squared ends 34 of the conveyor worms are removable from the sockets, but it will be apparent that end thrust due to pushing material outward will retain the said ends in said sockets. The worms may be removed for replacement or cleaning by removing the end straps 52 and pulling outward on the worms. Shaft 35 is suitably journaled in a housing 36 and has a ring gear 37 keyed or otherwise secured to it. Suitable dust seals 38 are, of course, provided to protect the journaled bearings.

As seen in Figure 3 the housing 36 also provides bearing for a shaft 39 having on its inner end a pinion gear 40 which meshes with and drives the ring gear 37 to rotate the worms 29 and 30. On its outer end the shaft 39 has a pulley 41 driven by belt 42 running over the pulley 43 fixed on the extended outer end of worm 7.

The cross conveyor assembly 18 is detachably supported by a pair of brackets 44 and 45 which brackets are fixed where convenient to a cross member or other extended portion 46 of the chassis 2. As seen in Figure 6, the brackets 44 and 45 have U-shaped lower ends or cradles 47 in which the tubular members of the conveyor rest. Referring again to Figure 3, the assembly 18 is retained in the brackets by a rod 48 having a compression spring 49 fixed to and extending from its lower end. The spring 49, tending to urge the conveyor assembly in a counter-clockwise direction, also serves to tension the belt 42. The spring 49 rests in a cuplike member 50 fixed to the housing 36 while the upper end of rod 48 is retained by a similar cup member 51 fixed to the down chute 25.

It will be apparent that the pulleys 41 and 43 and belt 42 may be removed and supplanted with sprockets and a chain thus providing a positive drive for the cross conveyors.

By pressing downward on the rod 48 against compression of spring 49 until the upper end of the rod is free from cup 51 the operator may remove the rod from its retaining position. With removal of the belt 42 the entire cross conveyor assembly 18 may then be lifted from the cradles 47, thus permitting ready passage through gates or between other obstacles such as trees, posts or the like.

In Figure 8 I have shown an alternate drive means for the conveyor assembly 18 which drive also permits ready removal of the assembly. As here shown the worm 7 has at its outer end a bevel gear 53 driving pinion 54 both of which are contained in a housing 55. The pinion 54, through a coupling means to be immediately described, is integrally rotative with a lower bevel gear 56 which drives pinion 57 to produce rotation of the conveyor screws through pinion 40 and ring gear 37.

The pinion 54 is mounted on a short journaled shaft 58 and is connected to shaft 59 by a universal joint 60. Bevel gear 57 is likewise connected to a short journaled shaft 61 which is connected to shaft 62 by universal joint 63. Shaft 59 has slidably mounted thereon a nut or threaded sleeve 64 which is retained on said shaft by the lower shouldered portion 65 thereof. The nut 64 engages threads 66 on the upper end of shaft 62 to retain the shafts 62 and 59 in alignment. The upper end of shaft 62 also has a tongue 67 which engages a groove in the shouldered portion 65 of shaft 59 thus providing positive drive between the said coupled shafts.

It will be apparent that by unscrewing the nut 64 the shafts 59 and 62 will become uncoupled, thus permitting ready removal of the cross conveyor assembly 18.

Having thus described my invention, what I claim as new and patentable is:

In combination with a vehicle, a powder distributing member located transversely of the vehicle and extending beyond the sides of the vehicle, said distributing member comprising casing means having efflux openings therein, a worm feed in said casing means, a hopper means for said casing means, and means for quickly detachably mounting the casing means on the vehicle, and a quick detachable drive from the vehicle to the worm feed, said mounting means comprising brackets on the vehicle in which the casing means rests by gravity, and latch means to hold the casings against jarring out of the brackets.

CLIFFORD L. ROSSELOT.